United States Patent [19]

Noguki et al.

[11] Patent Number: 5,087,678
[45] Date of Patent: Feb. 11, 1992

[54] METHOD FOR REDUCING FOAMING IN A VINYL CHLORIDE POLYMERIZATION REACTOR

[75] Inventors: Genji Noguki; Shigehiro Hoshida; Kouzou Kuwabara, all of Ibaraki, Japan

[73] Assignee: Shin-Etsu Chemical Co., Ltd., Tokyo, Japan

[21] Appl. No.: 457,280

[22] Filed: Dec. 27, 1989

[30] Foreign Application Priority Data

Jan. 5, 1989 [JP] Japan .................................. 64-784

[51] Int. Cl.$^5$ .............................................. C08F 2/20
[52] U.S. Cl. ..................................... 526/194; 526/202
[58] Field of Search ................................ 526/194, 202

[56] References Cited

U.S. PATENT DOCUMENTS

| | | | |
|---|---|---|---|
| 3,277,064 | 10/1966 | Lovelock | 526/194 |
| 4,455,413 | 6/1984 | Tomishima | 526/344.2 |
| 4,464,519 | 8/1984 | Mango | 526/200 |

FOREIGN PATENT DOCUMENTS 0062285  10/1982  European Pat. Off. .

OTHER PUBLICATIONS

Patent Abstracts of Japan, vol. 9, No. 331 (C-321) (2054) Dec. 25, 1985, & JP-A-60 158206 (Toyo Soda Kogyo K.K.) Aug. 19 1985.
Patent Abstracts of Japan, vol.10, No. 303 (C-378) (2359) Oct. 16, 1986, & JP-A-61 115908 (Kanegafuchi Chem Ind. Co. Ltd.) Jun. 3, 1986.

*Primary Examiner*—Christopher Henderson
*Attorney, Agent, or Firm*—McAuley Fisher Nissen Goldberg & Kiel

[57] ABSTRACT

Foaming above the aqueous polymerization mixture can be efficiently reduced in suspension polymerization of vinyl chloride monomer in an aqueous medium contained in a polymerization reactor equipped with a reflux condenser for removal of the heat of polymerization by admixing the polymerization mixture with additives comprising (a) from 0.002 to 0.007 part by weight of a partially saponified polyvinyl alcohol having a degree of saponification in the range from 20 to 50% by moles and an average degree of polymerization in the range from 200 to 400 and (b) from 0.001 to 0.01 part by weight of a silicone-based defoaming agent, each amount being per 100 parts by weight of the vinyl chloride monomer or the monomer mixture mainly composed of vinyl chloride, at a moment, preferably, before the reflux condenser is brought into operation. By this improvement, the resultant polyvinyl chloride resin product may have a greatly improved bulk density and particle size distribution without causing polymer scale deposition on the reactor walls.

2 Claims, No Drawings

METHOD FOR REDUCING FOAMING IN A VINYL CHLORIDE POLYMERIZATION REACTOR

BACKGROUND OF THE INVENTION

The present invention relates to a method for the preparation of a vinyl chloride-based polymer, referred to as a PVC hereinafter, of high quality useful as a molding material of various kinds of shaped articles. More particularly, the invention relates to a method for the preparation of a PVC having a greatly improved particle configuration by preventing foams rising in the polymerization reactor during the polymerization reaction.

It is a trend in the industry of PVC manufacture in recent years that the process of polymerization is conducted by using a polymerization reactor having an increasingly larger and larger capacity and various means are undertaken for decreasing the time taken for completing a cycle of the batch-wise polymerization reaction in order to improve the overall productivity of the process. It is usual accordingly that the polymerization reactor is equipped with a reflux condenser with an object to quickly remove the heat of polymerization evolved as the polymerization reaction proceeds by circulating the vinyl chloride monomer therein.

A problem in this method of operating a reflux condenser for the removal of the heat of polymerization, however, is that foaming sometimes takes place on the polymerization mixture in the reactor so that the particles of the PVC resin produced may have a low bulk density with a foamy structure. The PVC resin product thus prepared may contain coarse particles which may be retained on a screen of 48 mesh having a mesh opening of 0.297 mm according to JIS Z 8801 in the test of the particle size distribution. Such foamy resin particles are sometimes responsible for the scale deposition on the walls of the polymerization reactor in the upper part to seriously decrease the productivity.

Various means, of course, are undertaken to reduce the volume of foams on the polymerization mixture. For example, the foams can be destroyed mechanically by rotating foam-breaking blades provided on the stirrer shaft. This method is not always very effective in practice because of the deposition of the foam debris on to the foam-breaking blades and inner walls of the polymerization reactor resulting in scale deposition.

SUMMARY OF THE INVENTION

The present invention accordingly has an object to provide a novel and improved efficient method for the preparation of a high-quality PVC resin without the above described problems in the prior art.

Thus, the present invention provides an improvement in the polymerization of vinyl chloride monomer or a monomer mixture mainly composed of vinyl chloride in an aqueous polymerization medium contained in a polymerization reactor equipped with a reflux condenser for the removal of the heat of polymerization, which improvement comprises admixing the aqueous polymerization mixture with additives comprising (a) from 0.002 to 0.007 part by weight of a partially saponified polyvinyl alcohol having a degree of saponification in the range from 20 to 50% by moles and an average degree of polymerization in the range from 200 to 400 and (b) from 0.001 to 0.01 part by weight of a defoaming agent, each amount being per 100 parts by weight of the vinyl chloride monomer or the monomer mixture mainly composed of vinyl chloride, at a moment when the cumulative amount of the heat of polymerization removed through the reflux condenser does not exceed 10% of the overall heat of polymerization which should be evolved when the whole amount of the vinyl chloride monomer or the monomer mixture mainly composed of vinyl chloride has been polymerized.

DETAILED DESCRIPTION OF THE PREFERRED EMBODIMENTS

As is described above, the characteristic feature of the improvement according to the invention consists in the addition of specific additives to the polymerization mixture at a specified moment. The first of the additives is a partially saponified polyvinyl alcohol having a degree of saponification in the range from 20 to 50% by moles and an average degree of polymerization in the range from 200 to 400, which is added to the polymerization mixture in an amount in the range rom 0.002 to 0.007 part by weight per 100 parts by weight of the vinyl chloride monomer or the monomer mixture mainly composed of vinyl chloride. When the added amount thereof is too small, the defoaming activity to be exhibited by the defoaming agent cannot be fully exhibited so that the resultant PVC resin product may contain a considerable amount of foamy particles. When the added amount thereof is too large, on the other hand, the PVC resin product may have a somewhat decreased bulk density. The partially saponified polyvinyl alcohol should have the above mentioned relatively low degree of saponification. When the degree of saponification thereof is too high, the synergistic effect thereof with the defoaming agent is decreased so that the amount of scale deposition may eventually be increased. Further, the partially saponified polyvinyl alcohol should have the above mentioned specific average degree of polymerization. When the average degree of polymerization is too large, the synergistic effect thereof with the defoaming agent is also decreased so that the resultant PVC resin product may contain a considerable amount of foamy particles.

The second additive to be added to the polymerization mixture in combination with the above described specific polyvinyl alcohol is a defoaming agent which is preferably a silicone-based one such as silicone fluids, e.g., dimethyl polysiloxanes, diphenyl polysiloxanes and the like. In particular, the silicone-based defoaming agent is preferably of an aqueous emulsion type obtained by emulsifying a silicone fluid in an aqueous medium with admixture of from 0.05 to 0.4 part by weight of a finely divided silica powder having the surface rendered hydrophobic per 100 parts by weight of the silicone fluid. The amount of this defoaming agent added to the polymerization mixture is in the range of from 0.001 to 0.01 part by weight excepting the water as the medium of the aqueous emulsion per 100 parts by weight of the vinyl chloride monomer or the monomer mixture mainly composed of vinyl chloride. When the added amount thereof is too small, the defoaming activity to be exhibited thereby is insufficient so that the resultant PVC resin product may contain a considerable amount of foamy particles. Increase in the amount thereof over the above mentioned upper limit has no particular advantageous effect on the defoaming power rather with an economical disadvantage and other problems.

The above described two additives must be introduced into the polymerization mixture at a specified moment. Namely, the moment of the addition of the additives should be not later than the moment when the cumulative amount of the heat of polymerization removed through the reflux condenser does not exceed 10% of the overall heat of polymerization which should be evolved when the whole amount of the vinyl chloride monomer or the monomer mixture mainly composed of vinyl chloride has been polymerized. It is preferable that the additives are added to the polymerization mixture before the start of removal of the heat of polymerization through the reflux condenser. When the additives are added belatedly, no satisfactory defoaming can be obtained to allow the foams rising in the polymerization reactor resulting in a large amount of scale deposition on the reactor walls.

The above described improvement of the invention is applicable to the polymerization process of vinyl chloride monomer or a monomer mixture mainly composed of vinyl chloride in an aqueous medium regardless of the types of the process including suspension polymerization and emulsion polymerization, of which particularly satisfactory results could be obtained in the suspension polymerization. The suspension polymerization, to which the inventive improvement is applied, is not limited to the homopolymerization of vinyl chloride monomer alone but to the copolymerization of vinyl chloride with other comonomers copolymerizable therewith provided that the major fraction, e.g., 50% by weight or more, of the monomer mixture is vinyl chloride. Examples of the comonomer copolymerizable with vinyl chloride include: vinyl esters, e.g., vinyl acetate and vinyl propionate; esters of acrylic and methacrylic acids, e.g., methyl acrylate and ethyl acrylate; olefins, e.g., ethylene and propylene; vinyl ethers, e.g., lauryl vinyl ether and isobutyl vinyl ether; maleic anhydride; acrylonitrile; styrene; vinylidene chloride; and the like.

The polymerization initiator added to the polymerization mixture can be selected from monomer-soluble and water-soluble ones. Examples of the monomer-soluble polymerization initiator include: percarbonate compounds, e.g., diisopropylperoxy dicarbonate, di-2-ethylhexylperoxy dicarbonate and di(ethoxyethylperoxy)dicarbonate; perester compounds, e.g., tert-butylperoxy neodecanoate, tert-butylperoxy pivalate, tert-hexylperoxy pivalate and α-cumylperoxy neodecanoate; peroxide compounds, e.g., acetyl cyclohexylsulfonyl peroxide, 2,4,4-trimethylpentyl-2-peroxy phenoxy acetate, 3,5,5-trimethylhexanoyl peroxide and lauroyl peroxide; and azo compounds. e.g., azobis-2,4-dimethyl valeronitrile and azobis(4-methoxy-2,4-dimethyl valeronitrile). Examples of the water-soluble polymerization initiator include potassium persulfate, ammonium persulfate, hydrogen peroxide, cumene hydroperoxide and the like. These polymerization initiators can be used either singly or as a combination of two kinds or more according to need.

It is necessary that the aqueous polymerization medium contains a suspending agent in order to obtain a stable suspension of the monomer or monomer mixture in the medium. The suspending agent can be selected from known ones including: water-soluble cellulose ethers, e.g., methyl cellulose, ethyl cellulose, hydroxyethyl cellulose, hydroxypropyl cellulose and hydroxypropyl methyl cellulose; poly(acrylic acid); water-soluble natural polymers, e.g., gelatine; monomer-soluble surface active agents, e.g., sorbitan monolaurate, sorbitan trioleate, sorbitan monostearate, glycerin tristearate and ethylene oxide-propylene oxide block copolymers; water-soluble surface active agents, e.g., polyoxyethylene sorbitan monolaurate, polyoxyethylene glycerin oleate and sodium lauryl sulfate; calcium carbonate; calcium phosphate; sodium dodecylbenzene sulfonate and the like. These suspending agents can be used either singly or as a combination of two kinds or more according to need.

The suspension polymerization of the monomer or monomer mixture with the inventive improvement can be performed according to a conventional procedure well established in the art excepting the addition of the above specified specific additives at a specified moment, including the ways for the introduction of the various ingredients of the polymerization mixture, i.e. the aqueous medium, monomer or monomer mixture, suspending agent, polymerization initiator and the like, as well as the relative amounts of these ingredients and the schedule of the polymerization temperature control.

It is of course optional that the polymerization mixture is further admixed with various kinds of known additives conventionally used in the polymerization of vinyl chloride monomer including polymerization moderators, chain transfer agents, pH controlling agents, gelation improvers, antistatic agents, crosslinking agents, stabilizers, fillers, antioxidants, buffer agents, scale-deposition inhibitors and the like according to need.

As is understood from the above given description, the improvement of the invention serves to establish an efficient defoaming method against the foams rising above the polymerization mixture in the course of the polymerization reaction of vinyl chloride monomer in an aqueous medium so that an industrially great advantage is obtained thereby.

In the following, examples are given to illustrate the improvement of the invention in more detail but not to limit the scope of the invention in any way.

EXAMPLE 1

Six polymerization runs, referred to as Run No. 1 to No. 6 hereinbelow, were performed in the following manner. Thus, into a stainless steel-made polymerization reactor of 2000 liter capacity equipped with a stirrer, reflux condenser and jacket for passing cooling-/heating water were introduced 900 kg of deionized water, 420 g of a partially saponified polyvinyl alcohol having a degree of saponification of 80% by moles and an average degree of polymerization of 2000 and 260 g of 2-ethylhexylperoxy dicarbonate. After deaeration of the reactor, 600 kg of vinyl chloride monomer were introduced into the reactor to form a polymerization mixture, which was heated under agitation by passing hot water through the jacket up to a temperature of 57° C. to start the polymerization reaction.

In Run No. 1, the polymerization mixture in the reactor was admixed with 100 g of a partially saponified polyvinyl alcohol having a degree of saponification of 40% by moles and an average degree of polymerization of 300 in the form of a 30% by weight solution in methyl alcohol, referred to as the additive A hereinbelow, and 60 g of an aqueous emulsion containing 50% by weight of a dimethyl polysiloxane and 0.1% by weight of a finely divided silica powder rendered hydrophobic on the surface, referred to as the additive B hereinbelow, at a moment when the temperature of the polymerization mixture just had reached 57° C. Thirty minutes thereafter, the reflux condenser was brought into operation and removal of the heat of polymerization through the reflux condenser was continued for further 2 hours to continue the polymerization reaction., which was terminated when the pressure inside the reactor had dropped to 6.0 kg/cm$^2$G.

The conditions in the other five runs, i.e. Runs No. 2 to No. 6, undertaken for comparative purpose were substantially the same as in Run No. 1 described above except that: the amount of the additive A was increased to 200 g in Run No. 2; the amount of the additive A was decreased to 20 g in Run No. 3; the additive A was entirely omitted in Run No. 4; the additive B was omitted in Run No. 5; and both of the additives A and B were omitted in Run No. 6.

After completion of the polymerization reaction in each of the six runs, the polymerizate slurry was discharged out of the reactor and processed according to a conventional procedure to give 520 kg of a dry PVC resin as the product. The polymerization reactor after discharge of the polymerizate slurry was examined to check the amount of polymer scale deposition on the inner walls. The results were recorded as shown in Table 1 below according to three ratings of criterion including A for the aboslute absence of polymer scale deposition, B for a small amount of polymer scale deposition and C for a large amount of polymer scale deposition.

The PVC resin products were subjected to the tests of the bulk density in g/cm$^3$ according to the procedure specified in JIS K 6721 and the amount of coarse foamy particles in % by weight retained on a screen of 48 mesh fineness specified in JIS Z 8801. The results are shown also in Table 1.

EXAMPLE 2

Three polymerization runs, Runs No. 7, No. 8 and No. 9, were conducted in which the conditions of the polymerization reaction were substantially the same as in Example 1 and the amounts of the additives A and B were the same as in Run No. 1 in Example 1 except that the moment of addition of these additives A and B was varied so that the cumulative amount of the heat of polymerization removed through the reflux condenser up to the moment was 3%, 7% and 15%, respectively, of the overall heat of polymerization to be evolved when the whole amount of the monomer had been polymerized. The results of the experiments undertaken in the same manner as in Example 1 were as shown in Table 2 below.

TABLE 1

| Run No. | 1 | 2 | 3 | 4 | 5 | 6 |
|---|---|---|---|---|---|---|
| Scale deposition | A | A | A | A | A | C |
| Bulk density, g/cm$^3$ | 0.495 | 0.485 | 0.488 | 0.487 | 0.480 | 0.475 |
| Foamy particles, % | 0.06 | 0.00 | 0.10 | 0.11 | 0.15 | 0.30 |

TABLE 2

| Run No. | 7 | 8 | 9 |
|---|---|---|---|
| Scale deposition | A | A | C |
| Bulk density, g/cm$^3$ | 0.493 | 0.491 | 0.478 |
| Foamy particles, % | 0.03 | 0.05 | 0.25 |

What is claimed is:

1. In a method for the polymerization of vinyl chloride monomer or a monomer mixture composed mainly of vinyl chloride in an aqueous polymerization medium contained in a polymerization reactor equipped with a reflux condenser for the removal of the heat of polymerization, the improvement which comprises admixing the aqueous polymerization mixture with additives comprising
    (a) from 0.002 to 0.007 part by weight of a partially saponified polyvinyl alcohol having a degree of saponification in the range from 20 to 50% by moles and an average degree of polymerization in the range from 200 to 400 and
    (b) from 0.001 to 0.01 part by weight of a defoaming agent comprising an aqueous emulsion of a silicone fluid containing from 0.05 to 0.4 part by weight of a finely divided silica powder per 100 parts by weight of the silicone fluid, each amount being per 100 parts by weight of the vinyl chloride monomer or the monomer mixture mainly composed of vinyl chloride, at a moment when the cumulative amount of the heat of polymerization removed through the reflux condenser does not exceed 10% of the overall heat of polymerization which should be evolved when the whole amount of the vinyl chloride monomer of the monomer mixture mainly composed of vinyl chloride has been polymerized.

2. The improvement as claimed in claim 1 wherein the additives (a) and (b) are added to the polymerization mixture before the reflux condenser is brought into operation.

* * * * *